W. W. LILES.
CHURN BODY.
APPLICATION FILED OCT. 20, 1910.
978,763.
Patented Dec. 13, 1910.
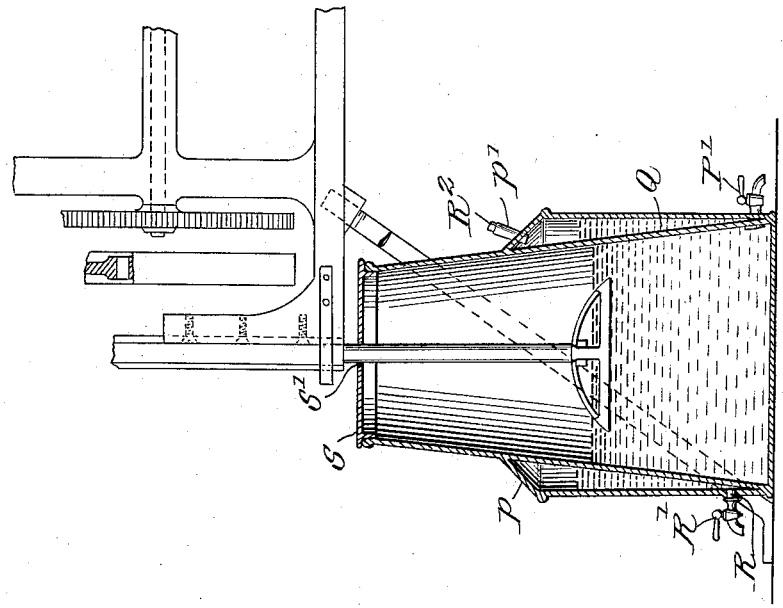
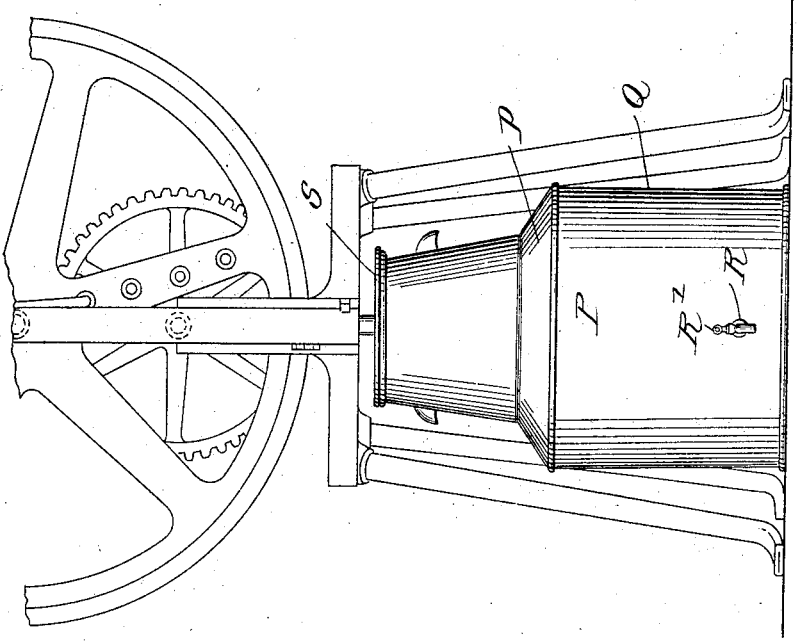
WITNESSES:
INVENTOR
WILLIAM W. LILES.
BY
ATTORNEYS

UNITED STATES PATENT OFFICE.

WILLIAM W. LILES, OF MINERAL WELLS, TEXAS.

CHURN-BODY.

978,763. Specification of Letters Patent. Patented Dec. 13, 1910.

Original application filed December 31, 1909, Serial No. 535,738. Divided and this application filed October 20, 1910. Serial No. 588,217.

*To all whom it may concern:*

Be it known that I, WILLIAM W. LILES, a citizen of the United States, and a resident of Mineral Wells, county of Palo Pinto, and State of Texas, have invented certain new and useful Improvements in Churn-Bodies, of which the following is a specification.

My invention relates to improvements in churn bodies, or receptacles in which cream is to be churned into butter, and has for its object to produce a simple, cheap and efficient churn body, which shall maintain the cream in condition best adapted for churning, the present application being a division of application filed by me December 31, 1909, Serial No. 535,738.

My invention consists in certain novel features of constructions as will be hereinafter fully described and pointed out in the claims, reference being had to the accompanying drawing, in which, Figure 1 is a front elevation showing my body used in connection with churning mechanism. Fig. 2 is a vertical section of the same.

In carrying out my present invention I use a receptacle P which is preferably of metal and is made slightly smaller at its upper end than at its lower end, being substantially a truncated cone. At the lower end and to one side I provide a cream draw-off spout P' which passes from the receptacle through the annular water chamber Q which is substantially cylindrical, that is, it has vertical walls; said water chamber does not extend entirely to the top of the cream receptacle, but, as shown, stops short of the upper end of the cream receptacle and has the upper end closed by a wall $p$ which is inclined and soldered to the outer surface of the cream receptacle, thus preventing the entrance of dirt or dust to the annular chamber, and further protecting the water from the effects of surrounding atmosphere. A filling spout $p'$ through the wall $p$ serves as a medium for filling the annular chamber, a cork $R^2$ or other suitable closure being used for sealing said filling spout.

Near the lower end of the annular water chamber, is provided water draw-off R, controlled by a stopcock R' by means of which water may be withdrawn from the annular chamber when so desired. A cover S having a central opening S' to receive a dasher shaft completes the churn body. The purpose of the annular water chamber Q is to regulate the temperature of the cream to suit various conditions.

In constructing my improved churn body, I find it desirable and preferable to have the bottom of the annular chamber and the cream receptacle coincident and coextensive, that is, one wall serves as the bottom for both.

While I shall generally use this churn body in connection with the churning mechanism described, in the application of which this application is a division, yet it is obvious that it may be used with any suitable churning mechanism.

I claim:

1. A churn device consisting of a truncated cone shaped body portion and a closed annular cylindrical water jacket surrounding the same, said closed annular water jacket being of less extent than the height of the body portion, the bottom of the body portion and the jacket being coincident and co-extensive.

2. A churn device consisting of a truncated cone shaped body portion and an annular cylindrical water jacket surrounding the same from the bottom to a height slightly above the cream line, the upper end of the jacket being connected to the body portion by an air-tight cover, the bottom of the container and the water jacket being coincident and co-extensive, and means for independently drawing off the contents of the container and the water chamber.

WILLIAM W. LILES.

Witnesses:
   A. E. TANNER,
   H. B. BARKER.